United States Patent
Matsui et al.

[15] 3,676,402
[45] July 11, 1972

[54] LOW-TEMPERATURE CURABLE BLOCKED ISOCYANATE COMPOSITIONS CONTAINING A STANNOXANE CATALYST

[72] Inventors: Yutaka Matsui, Ashiya; Noritoshi Mise, Ikeda; Jugo Goto, Osaka; Makoto Yokoo, Toyonaka, all of Japan

[73] Assignee: Takeda Chemical Industries, Ltd., Osaka, Japan

[22] Filed: Oct. 29, 1970

[21] Appl. No.: 85,254

Related U.S. Application Data

[63] Continuation-in-part of Ser. No. 880,462, Dec. 3, 1969, abandoned, Continuation of Ser. No. 403,902, Oct. 14, 1964, abandoned.

[30] Foreign Application Priority Data

Oct. 29, 1963   Japan..................................38/58108

[52] U.S. Cl...............260/75 NC, 260/75 NB, 260/77.5 AB, 260/77.5 AC, 260/77.5 TB
[51] Int. Cl. ...................................C08g 22/42, C08g 22/18
[58] Field of Search ...............260/77.5 TB, 2.5 AB, 2.5 AC, 260/75 NB, 75 NC, 77.5 AB, 77.5 AC

[56] References Cited

UNITED STATES PATENTS 3,192,185   6/1965   Achterhof et al.......................260/75
3,194,770   7/1965   Hostettler..............................259/431
3,240,730   3/1966   Hostettler et al. ......................260/2.5
3,317,463   5/1967   Schonfeld..............................260/47

FOREIGN PATENTS OR APPLICATIONS 1,032,059   6/1966   Great Britain............260/77.5 TB UX
1,124,459   8/1968   Great Britain.............260/2.5 AB UX

OTHER PUBLICATIONS

Okawara et al., Jour. of Organometallic Chem., Vol. 1, No. 1, pages 81– 88 (1963).
Proceedings of The Chemical Society, (London), pages 457– 458 (1961).
Saunders et al., Polyurethanes, Part I, Interscience (N.Y.) 1962, pp. 118– 121 Call No. TP986P6S3.

*Primary Examiner*—James A. Seidleck
*Assistant Examiner*—H. S. Cockeram
*Attorney*—Yuka

[57] ABSTRACT

Octaalkyl-stannoxanes are provided herein which permit regeneration of an isocyanate group in a blocked isocyanate compound at a lower temperature than previously possible. The resulting compounds with the regenerated isocyanante groups are useful, e.g., in the preparation of urethane resin in the conventional manner.

25 Claims, No Drawings

LOW-TEMPERATURE CURABLE BLOCKED ISOCYANATE COMPOSITIONS CONTAINING A STANNOXANE CATALYST

This is a continuation-in-part application of U.S. Application, Ser. No. 880,462, filed Dec. 3, 1969 now abandoned, which application is a streamlined continuation application of U.S. Application, Ser. No. 403,902, filed Oct. 14, 1964, the latter application being now abandoned.

This invention relates to an isocyanate composition, more particularly, to an isocyanate composition consisting of a blocked isocyanate compound and a new catalyst for regenerating an isocyanate group from the blocked isocyanated compound.

In the manufacture of a polymeric compound useful as, for example, a film, a paint, a coating agent, an impregnating agent, or as moulding compounds and so on, by the reaction of an isocyanate compound and a compound containing active hydrogen atoms, it has been known to employ a blocked isocyanate compound in place of said isocyanate compound.

However, for the production of said polymeric compound by the reaction of a blocked isocyanate compound with a compound containing active hydrogen atoms, it is necessary to heat the reactants at such high temperature as from about 170° C to about 230° C. Needless to say, it is not desirable from the industrial viewpoint to employ such a high temperature treatment as above, especially since such a treatment makes it almost impossible to apply these procedures to the fields of fibers, plastics-sheet, rubbers and emulsion paints which are susceptible to heat.

Much of the research has revolved around a method of producing a catalyst that accelerates the regeneration of an isocyanate group from a blocked isocyanate compound, and as a result, certain catalysts, such as methyl morpholine, have been discovered.

With the use of a per se known catalyst such as methyl morpholine, however, it is also necessary for the production of a polymeric compound to heat the reactants at higher than about 160° C for half an hour or longer and therefore the above-mentioned defects in known procedures are left unsolved.

As a result of investigations widely carried out by the present inventors, it was unexpectedly found that the compound shown by the following general formula (I) makes it possible to regenerate an isocyanate group from a blocked isocyanate compound at a lower temperature than in the case of using a per se known catalyst, and to allow the thus-regenerated isocyanate group to react readily with a compound containing active hydrogen atoms to obtain a polymeric compound.

Therefore, with the use of the compound shown by the following general formula (I), it becomes possible to apply the procedure using a blocked isocyanate compound as an isocyanate component to the field of fibers, plastics-sheet, rubbers, emulsion paints, etc., which are susceptible to heat.

This invention relates to the isocyanate compositions consisting of a blocked isocyanate compound, the compound shown by the general formula (I), and, if desired, a compound containing active hydrogen atoms (hereinafter referred to as simply an "additional compound").

(I) 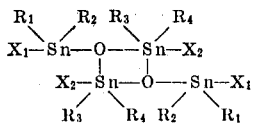

wherein $X_1$ stands for a halogen atom, a hydroxyl group, a lower alkoxy group, carboxylic acyloxy, NCO and NCS, $X_2$ stands for a hydroxyl group, a lower alkoxy group, carboxylic acyloxy, NCO or NCS, and each of $R_1$, $R_2$, $R_3$ and $R_4$, which may be identical or different, stands for a lower alkyl group.

In the present invention, a blocked isocyanate compound means the compound containing blocked isocyanate groups in its structure obtained by the addition reaction of a polyisocyanate compound with an isocyanate blocking agent.

As a polyisocyanate compound, there may be employed (1) such aliphatic polyisocyanates as tetramethylene diisocyanate, hexamethylene diisocyanate, such aromatic polyisocyanates as phenylene diisocyanate, tolylene diisocyanate (TDI), diphenylmethane diisocyanate (MDI), diphenylethane diisocyanate (EDI), naphthylene diisocyanate, diphenylmethane triisocyanate, bitolylene diisocyanate, dianisidine diisocyanate, triphenylmethane triisocyanate, diphenylether triisocyanate, $\omega,\omega'$ diisocyanate dimethylbenzene (MXDI), (2) such addition products as those having two or more terminal NCO groups which are obtained by the reaction of an excess amount of the above-mentioned polyisocyanates with lower molecular active hydrogen compounds such as ethylene glycol, propylene glycol, butylene glycol, trimethylol propane, hexanetriol, glycerol, sorbitol, pentaerythritol, castor oil, ethylenediamine, hexamethylenediamine, monoethanolamine, diethanolamine, triethanolamine, or with such polymeric compounds having active hydrogen atoms as polyether polyols or polyester polyols.

Of the polyisocyanate compounds, aromatic polyisocyanates such as TDI, MDI, MXDI, or EDI, and the addition products having two or more terminal NCO groups obtained by the addition of the excess amount of said aromatic polyisocyanate with the aforementioned low or high molecular weight compounds containing active hydrogen atoms, are preferable.

As the polyether polyols mentioned above, there may be employed products obtained by the addition polymerization of one or more alkylene oxides such as ethylene oxide, propylene oxide, butylene oxide, or styrene oxide, to one or more polyols, as the initiator, such as ethylene glycol, diethylene glycol, propylene glycol, glycerol, trimethylol propane, hexanetriol, pentaerythritol, sorbitol, sucrose, mannitol, sorbide, mannitan, or sorbitan, or to amines such as ethylene diamine, propylene diamine, and ethanolamine under alkaline or acidic conditions.

These polyether polyols may be prepared in a known manner as described in the publication entitled "High Polymer Vol. XIII, Polyethers Part 1" (1963) by Norman G. Gaylord published by Interscience Publishers, New York, N.Y. The molecular weight of the polyether polyols may be varied depending upon the purpose, and is generally selected from the range of about 300 to about 3,000, preferably about 400 to about 2,000. As examples of the polyester polyol mentioned above, there is employed a product obtained by the reaction of one or more polyols such as ethylene glycol, propylene glycol, diethylene glycol, triethylene glycol, butylene glycol, trimethylol propane, glycerol, hexanetriol or pentaerythritol with one or more polycarboxylic acids such as oxalic acid, succinic acid, glutaric acid, adipic acid, pimelic acid, suberic acid, azelaic acid, sebacic acid, maleic acid, fumaric acid, itaconic acid, phthalic acid, iso-phthalic acid, terephthalic acid, or their acid anhydrides.

These polyester polyols are prepared in a known manner as described in the publication entitled "Polyesters and Their Application," Apr. 1959, published by Bjorksten Research Lab., Inc., New York, N.Y. The molecular weight of the polyester polyols may vary depending upon the purpose desired, and is generally selected from the range of about 300 to about 3,000, preferably about 400 to about 2,000.

As an example of the isocyanate blocking agent contemplated in the present invention, there are employed those known materials, such as various phenolic compounds, for example, phenol, thiophenol, chlorophenol, methyl thiophenol, ethyl phenol, ethyl thiophenol, nitrophenol, cresol, xylenol or resorcinol; alcohols such as ethanol, methanol, propanol, isopropanol, butanol, tert-butanol, tert-pentanol, tert-butanethiol or tert-hexanol, or derivatives thereof such as ethylene chlorohydrine, $\omega$-hydroperfluoroalcohols or 1,3-dichloro-2-propanol; aromatic amines such as diphenylamine, diphenyl naphthyl amine or xylidine; imides such as succinic acid imide or phthalic acid imide; active methylene compounds such as acetoacetic acid esters, acetyl acetone or malonic acid diesters; mercaptans such as 2-mercapto benzothiazol or tert-dodecyl mercaptan; lactams such as ε-caprolactam, δ-valerolactam, γ-butyrolactam or β-propyllactam, imines such as ethylene imine, urea compounds such as urea, thiourea or diethylene urea, oximes such as acetoxime, methylethyl-ketone oxime, or cyclohexanone oxime, diaryl compounds such as carbazole, phenyl naphthyl amine or N-phenyl xylidine, bisulfates and borates. Of these blocking agents, phenolic compounds and ethanol are preferable. The blocked isocyanate compounds of the present invention may be readily prepared in a known manner, for example, by reacting a polyisocyanate compound with an equivalent or a slightly excess amount of an isocyanate blocking agent in the presence or absence of a solvent having no active hydrogen atom, such as ketones, esters or aromatic hydrocarbons at room temperature or about 40° to about 120° C.

In the general formula (I), $X_1$ and $X_2$ are the same or different, and stand for such components as halogen atoms (e.g., chlorine, bromine, iodine, etc.), hydroxyl groups, alkoxy groups (e.g., methoxy, ethoxy, propoxy, butoxy, etc.), carboxylic acyloxy groups (e.g., formyloxy, acetoxy, propionoyloxy, butyroyloxy, hexanolyloxy, lauroyloxy, oleoyloxy, palmitoyloxy, stearoyloxy, allylcarbonyloxy, cyanoacetoxy, benzolyloxy, benzyloyloxy alkyl, maleoyloxy, etc.), except the case where both $X_1$ and $X_2$ are halogen atoms, because such a compound has a low activity as catalyst.

$R_1$, $R_2$, $R_3$ and $R_4$ are the same or different, and respectively stand for an alkyl group such as a methyl, ethyl, propyl, butyl, isopropyl, heptyl and hexyl group, but preferably an alkyl group having one to four carbon atoms such as methyl, ethyl, propyl, butyl, and iso-propyl.

These compounds are prepared, for example, by the procedure described in the "Journal of Organometallic Chemistry," Volume 1, No. 1, pages 81-88 (1963). As to $X_1$ and $X_2$, such compounds in the general formula (I) are preferably employed wherein $X_1$ is halogen and $X_2$ is hydroxyl, both $X_1$ and $X_2$ are carboxylic acyloxy groups, $X_1$ is carboxylic acyloxy and $X_2$ is hydroxyl, $X_1$ is alkoxy and $X_2$ is halogen, $X_1$ is alkoxy and $X_2$ is carboxylic acyloxy, or both $X_1$ and $X_2$ are NCO groups or NCS groups. As the carboxylic acyloxy groups, those having one to 18 carbon atoms are preferred. As alkoxy groups, those having one to three carbon atoms are desirable. Also, the procedure used to prepare the stannoxanes of the present invention may be found in the "Proceedings of the Chemical Society" publication (1961), pages 457–458. From the above references, it is clear that the compounds $R_4Sn_2X_2O$ have at first been assumed to have the distannoxane formula

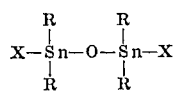

but later these compounds have been more reasonably assumed to form a dimer at least in a solvent. As stated in the references, the most reasonable structure of the dimer can be considered as

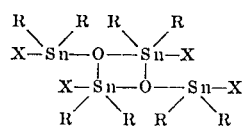

though the precise dimeric structure has not yet been proved.

As is well known in the art, organometallic compounds form more complex structures in comparison with ordinary organic compounds, and thus the precise chemical structures of the organometallic compounds are rather difficult to prove chemically and/or physically. Such being the case, the organometallic compounds have been shown by a hypothetical structure which is considered to be most simplified. For instance, the so-called dialkyl tin oxide has been shown by the simple structure of

but actually this compound is not present in the monomer form but in a considerable complex polymeric structure which has not been proved.

In view of the aforementioned technical state of the art, the stannoxane compound of the present invention may be represented by any of the various monomeric formulas (distannoxane structure) or the dimeric structure.

In any event, in the present invention, use in made of, as a catalyst, a compound which has been at first represented by a tetralkyl; distannoxane structure and later considered to form a dimeric structure.

Throughout the present specification, the stannoxane compound is hypothetically shown by the dimeric structure:

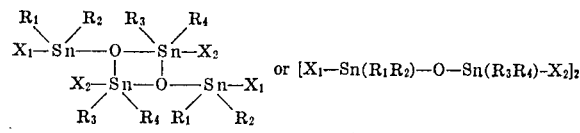

and named octaalkyl stannoxane.

The octaalkyl stannoxane compound of the present invention may be prepared, for example, by the methods described in the above "Journal of Organometallic Chemistry," Vol. 1, No. 1, pages 81-88 (1963) and "Journal of American Chemical Socity," Vol. 82, page 3285 (1960). For example, the reaction of a dialkyl tin oxide with an acid or its derivative can give the present compound wherein $X_1$ and $X_2$ are the corresponding alkylcarbonyloxy, the reaction of the compound (I) wherein $X_1$ and $X_2$ are halogen with an alkali hydroxide can give the present compound wherein $X_1$ is halogen and $X_2$ is hydroxy, a partial alcoholysis of the compound (I) wherein $X_1$ and $X_2$ are halogen can give the present compound wherein $X_1$ and $X_2$ are alkoxy, a reaction of the compound (I) wherein $X_1$ and $X_2$ are halogen with an alkali isocyanate can give the object compound wherein $X_1$ and $X_2$ are isocyanate, a reaction of the compound (I) wherein $X_1$ and $X_2$ are isocyanate, a reaction of the compound (I) wherein $X_1$ and $X_2$ are isocyanate with an alcohol can give the objective compound wherein $X_1$ is isocyanate and $X_2$ is the corresponding alkoxy, and the compound (I) wherein $X_1$ and $X_2$ are halogen can be obtained by the reaction of a dialkyl tin oxide with a hydrohalogenic acid.

Of the compounds described above, the most desirable compounds for practical use are exemplified as the following:
Octabutyl-dichloro-dihydroxy-stannoxane
Octabutyl-tetraacetoxy-stannoxane
Octabutyl-tetrastearoyloxy-stannoxane
Octabutyl-tetraformyloxy-stannoxane
Octabutyl-tetra-2-ethyl-hexanoyloxy-stannoxane
Octapropyl-dichloro-dihydroxy-stannoxane
Octabutyl-tetralauroyloxy-stannoxane
Octaethyl-dichloro-dihydroxy-stannoxane
Octamethyl-dichloro-dihydroxy-stannoxane
Octapropyl-tetraacetoxy-stannoxane
Octabutyl-tetraacryloyloxy-stannoxane
Octabutyl-tetracyanoacetoxy-stannoxane
Octabutyl-tetrabenzyloyoxy-stannoxane
Octaethyl-tetracetoxy-stannoxane
Octamethyl-tetrastearoyloxy-stannoxane
Octamethyl-tetraacetoxy-stannoxane
Octabutyl-dihydroxy-diacetoxy-stannoxane Octabutyl-dihydroxy-diformyloxy-stannoxane
Octapropyl-dihydroxy-diacetoxy-stannoxane
Octabutyl-tetrakis-(monomethyl maleoyloxy)-stannoxane
Octabutyl-dihydroxy-dilauroyloxy-stannoxane
Octaethyl-dihydroxy-diacetoxy-stannoxane
Octaethyl-dihydroxy-di(2-ethyl-hexanoyloxy)-stannoxane
Octabutyl-dichloro-dimethoxy-stannoxane
Octabutyl-dichloro-diethoxy-stannoxane
Octabutyl-dichloro-dipropoxy-stannoxane
Octapropyl-dichloro-dimethoxy-stannoxane
Octaethyl-dichloro-dimethoxy-stannoxane
Octabutyl-tetraisocyanato-stannoxane
Octabutyl-tetraisothiocyanato-stannoxane
Octapropyl-tetraisocyanato-stannoxane
Octaethyl-tetraisocyanato-stannoxane
Octaethyl-tetraisothiocyanato-stannoxane
Octapropyl-tetraformyloxy-stannoxane
Octaethyl-tetraformyloxy-stannoxane
Octamethyl-tetraformyloxy-stannoxane
Octamethyl-diacetoxy-dihydroxy-stannoxane
Octaethyl-diformyloxy-dihydroxy-stannoxane
Octapropyl-diformyloxy-dihydroxy-stannoxane
Octabutyl-dimethoxy-diacetoxy-stannoxane
Octabutyl-dimethoxy-diformyloxy-stannoxane
Octabutyl-diethoxy-diacetoxy-stannoxane
Octabutyl-tetraoleoyloxy-stannoxane
Octabutyl-tetramaleoyloxy-stannoxane
Octabutyl-dihydroxy-bis-(monomethyl maleoyloxy) stannoxane
Octabutyl-diethoxy-distearoyloxy-stannoxane
Octabutyl-diethoxy-diformyloxy-stannoxane
Octapropyl-dimethoxy-diacetoxy-stannoxane
Octabutyl-dipropoxy-diacetoxy-stannoxane
Octapropyl-dimethoxy-dilauroyloxy-stannoxane It must be pointed out that the catalysts employed in this invention are not restricted to the compounds exemplified above. That is, compounds other than the above-mentioned compounds, falling under the previously mentioned general formula, also have higher activity as catalysts for regenerating the NCO groups from a blocked isocyanate compound that from a conventional catalyst.

The following General Examples illustrate the specific mode of preparing the basic octaalkyl-stannoxanes for use in the compositions of the present invention: Octabutyl-tetralauroyloxy-stannoxane:

To 600 parts by volume of toluene are added under stirring 200 parts of lauric acid and 250 parts of dibutyl tin oxide, followed by heating at 60° C. After 15 to 20 minutes, a small amount of impurities is filtered off, and toluene and water by-produced are distilled off by heating under reduced pressure. This procedure gives 440 parts of octabutyl-tetralauroyloxy-stannoxane as a colorless transparent substance. Octabutyl-tetraacetoxy-stannoxane:

To 500 parts by volume of toluene are added 249 parts of dibutyl tin oxide and then 60 parts of acetic acid under stirring, following by heating at 50° to 60° C for 20 to 30 minutes. The resultant is filtered and the filtrate is distilled at 60° C under a pressure of 10 to 30 mm Hg to remove toluene and water by-produced. The residue is cooled to room temperature to give 300 parts of octabutyl-tetraacetoxy-stannoxane as a colorless substance melting at 54° to 57° C. Octabutyl-dichloro-dihydroxy-stannoxane:

Into 2,000 parts by volume of acetone is dissolved 300 parts of octabutyl-tetrachloro-stannoxane under heating. To the solution is added 22.4 parts of sodium hydroxide in 200 parts by volume of water, followed by refluxing for 1 hour. The resultant is distilled to remove most of the acetone, and the residue is cooled to room temperature. This procedure gives 275 parts of octabutyl-dichloro-dihydroxy-stannoxane as white crystals melting at 115° to 120° C. Octabutyl-tetraisocyanato-stannoxane:

55 parts of octabutyl-tetrachloro-stannoxane is dissolved in a mixture of 600 parts by volume of toluene and 50 parts by volume of ethanol. To the solution added 16.2 parts of potassium isocyanate, followed by stirring for 1 hour and then further stirring at 70° C for 1 hour. The resultant is distilled is distilled to remove the solvent, and to the residue is added 500 parts by volume of toluene. This mixture is filtered to remove the insolubles (potassium chloride), and the filtrate is concentrated. This procedure gives white crystals, which are then recrystallized from toluene to give octabutyl-tetraisocyanato-stannoxane as white crystals melting at 163° to 166° C. Octabutyl-diisothiocyanate-diethoxy-stannoxane:

10 parts of octabutyl-tetraisothiocyanato-stannoxane is dissolved in 500 parts of volume of ethanol. To the solution is added 5 parts by volume of pyridine, followed by refluxing for 30 minutes. The greater part of ethanol is removed from the resultant, and the residue is cooled, whereby there are precipitated white crystals. Recovering by filtration of the crystals gives 9.2 parts of octabutyl-diisothiocyanato-diethoxy-stannoxane melting at 109° to 116° C. Octabutyl-tetrachloro-stannoxane:

To 1,000 parts by volume of acetone are added 250 parts of dibutyl tin oxide and 105 parts of 35 percent hydrochloric acid, followed by heating at 50° C. After the white of dibutyl tin oxide has disappeared, the resultant is filtered to remove impurities and the filtrate is distilled to remove acetone. The residue is cooled to give octabutyl-tetrachloro-stannoxane as white crystals melting at 110° to 112° C.

This invention includes the composition (A) consisting of such a blocked isocyanate compound as mentioned above and the compound shown by the general formula (I), and the composition (B) consisting of such a blocked isocyanate compound as mentioned above, a compound shown by the general formula (I) and an "additional compound" containing active hydrogen atoms.

For preparing the composition (A) of this invention, it is preferable to employ, as a blocked isocyanate compound, the reaction product of a blocking agent with a high molecular compound containing terminal NCO groups obtained by reacting an excess of a polyisocyanate compound and a high molecular compound containing active hydrogen atoms such as the aforementioned polyether polyols or polyester polyols, and more preferably a polyester polyol compound. The molecular weight of the polyester polyol or polyether polyol compounds is desirably from about 1,500 to about 2,000, and their functionality is preferably from 3 to 5.

By heating the composition (A), NCO groups are regenerated and the thus-regenerated NCO groups react with the moisture in the air to produce a polymeric compound.

As an "additional compound" containing active hydrogen atoms in the composition designated (B) of this invention, there may be mentioned, for example, such high molecular compounds as polyether polyols or the polyester polyols mentioned above, celluloses, polyamides, polyvinyl alcohols, polyvinyl acetates, and low molecular weight compounds such as polyols (e.g., ethylene glycol, propylene glycol, diethylene glycol, butylene glycol, triethylene glycol, trimethylol propane, glycerol, hexane triol, pentaerythritol, mannitol, sorbitol or sucrose), amino alcohols (e.g., ethanolamine or methanolamine), aliphatic amines (e.g. ethylene diamine, hydrazine, hexamethylene diamine or propylene diamine) and aromatic amines (e.g., phenylene diamine, diphenylmethane diamine, diphenylethane diamine, 4,4'-methylene-bis-(2-chloraniline) or ω,ω'-diamino-dimethylbenzene).

For the composition (B), in the case wherein the blocked isocyanate compound employed is a low molecular one, that is, the reaction product of a blocking agent with the aforementioned aliphatic or aromatic polyisocyanate compounds or with a low molecular weight addition product containing terminal NCO groups obtained by the addition reaction of an excess amount of the aliphatic or aromatic polyisocyanate compound with the aforementioned low molecular compound containing active hydrogen atoms, it is preferable to employ, as an additional compound containing active hydrogen atoms, a high molecular compound of those exemplified above, more generally, a polyether polyol or a polyester polyol.

The molecular weight of the additional high molecular compound containing active hydrogen atoms should not be less than about 150, more preferably, from about 300 to about 2,000. On the contrary, in the case where the blocked isocyanate compound employed is a high molecular one, that is, the reaction product of a blocking agent with a high molecular addition product containing terminal NCO groups obtained by the addition reaction of an excess amount of an aliphatic or aromatic polyisocyanate compound containing active hydrogen atoms, both an additional high molecular compound containing active hydrogen atoms and an additional low molecular one as exemplified above, are preferably employed for the composition (B).

In the latter case, as an addition low molecular compound containing active hydrogen atoms, such aromatic amines as phenylene diamine, diphenylmethane diamine, diphenylethane diamino, 4,4'-methylene-bis-(2-chloraniline) or $\omega,\omega'$-diamino-dimethylbenzene are desirable, and as an additional high molecular compound, the polyether polyols and polyester polyols mentioned above are desirable, that is, those compounds whose molecular weights are not less than about 150, and more preferably, from about 300 to about 2,000.

By heating the composition (B), NCO groups are regenerated and the thus-regenerated NCO groups react with an "additional compound" containing active hydrogen atoms which co-exists in the composition (B) to produce a polymeric compound.

The properties of the polymeric compound produced by heating the composition (A) or (B) vary widely with the type, the molecular weight and the functionality of the blocked isocyanate compound used and/or of the "additional compound" containing active hydrogen atoms co-existing, therefore, the blocked isocyanate compound and/or the "additional compound" containing active hydrogen atoms are selected in accordance with the purpose in view.

Generally speaking, the lower the molecular weight of the blocked isocyanate compound used and/or of the coexisting "additional compound" containing active hydrogen atoms and the higher their functionality, the more rigid the polymeric compound produced by heating the composition of the present invention and the higher their molecular weight and the lower their functionality; the more elastic the polymeric compound.

The composition of the present invention is prepared by mixing a blocked isocyanate compound, a compound represented by the general formula (I) and, if desired, an "additional compound" containing active hydrogen atoms.

The manner of mixing may be any of the known mixing procedures and the composition of this invention may be prepared, for example, by adding the compound shown by the general formula (I) as it is or as a solution or emulsion to the blocked isocyanate compound or to a mixture consisting of the blocked isocyanate compound and the "additional compound" containing active hydrogen atoms.

Since the compound shown by the general formula (I0 also accelerates the reaction of the NCO group with an active hydrogen atom, the blocked isocyanate compound can be easily prepared by reacting the polyisocyanate compound and the blocking agent in the presence of a compound encompassed by the general formula (I), and the thus-obtained reaction product consists of a blocked isocyanate compound and the compound shown by the general formula (I).

Therefore, by the procedure as above, the composition (A) of this invention can be prepared in one step.

The larger the amount of the compound shown by the general formula (I) employed, the lower the temperature that the NCO group is regenerated from the blocked isocyanate compound and the thus-regenerated NCO group reacts with the active hydrogen atoms to produce a polymeric compound. THe amount of the compound shown by the general formula (I) employed is generally in the range of from about 0.01 to about 5 parts by weight per 100 parts by weight of the blocked isocyanate compound, and more preferably, from about 0.1 to about 1 part.

The amount of the "additional compound" containing active hydrogen atoms used varies with the intended use of the composition, and generally may be such that the moles of the blocked NCO group is half or more than that of the moles of the active hydrogen atom employed.

Since the compound shown by the general formula (I) accelerates the regeneration of the NCO group from a blocked isocyanate compound, the heating temperatures used to produce the polymeric compound from the composition of the present invention is much lower than that used in the case of producing conventional blocked isocyanate compositions.

Thus, the composition of the present invention can be applied effectively to a wide range of industries, more especially, to such fields as fabrics, plastics-sheets, rubbers and emulsion baking paints, to which the application of a blocked isocyanate composition has been previously considered to be almost impossible because of their susceptibility to heat.

For example, emulsion baking paints can be prepared by dissolving or emulsifying the composition of this invention into such solvents as esters (e.g., butyl acetate, ethyl acetate, methyl acetate, "Cellosolve" acetate or methyl "Cellosolve" acetate) and ketones (e.g., acetone or methyl isobutyl ketone), and if desired, the mixing with diluents such as benzene, toluene or xylene.

The thus-prepared emulsion baking paints can be applied to any materials, for example, to metals, woods, plastics, leathers, rubbers and so one.

By heating the materials treated with the paint at a lower temperature for a short period, films of good properties can be formed on the surface thereof without any bad effect on the materials themselves.

The emulsion prepared by emulsifying the composition of the present invention is useful as an impregnation agent and adhesive agent.

For example, fabrics, non-woven fabrics, clothes, papers and plastics-sheets may be dipped into the emulsion of the present invention, dried and heated at a low temperature for a short period of time to produce a polymeric compound on the surface thereof. Thus, the properties of the materials mentioned above are improved. And by the procedure whereby any material such as, for example, materials selected from those mentioned above are heated at a low temperature for a short period, a powerful adhesion between the two materials is achieved.

It is clear from the foregoing that this invention and the use of a compound of formula (I) as a catalyst according to this invention have great value from the industrial viewpoint.

For the purpose of a better understanding of this invention, the following examples of presently preferred embodiments are given. However, it is to be understood that the invention is not limited to these examples.

In these examples, the amounts are expressed in parts by weight unless otherwise specified. Parts by weight bear the same relation to parts by volume as do grams to milliliters. Example 1.

A blocked isocyanate compound (100 parts) which is obtained by reacting MDI (250 parts) with phenol (190 parts) is mixed with octabutyl-tetraacetoxy-stannoxane (0.1 part), and then the mixture is further mixed with a polyester polyol (100 parts), having a hydroxyl number of 253, dissolved in toluene (200 parts), which polyol is obtained by the condensation of adipic acid (438 parts), 1,4-butylene glycol (180 parts) and hexane triol (268 parts).

The thus-obtained mixture is applied to a metal plate and heated in an electric furnace to cure the polyester pyolol with NCO groups regenerated by heating.

As controls, mixture products consisting of the same ingredients as above excepting the employment of N-methyl morpholine (0.1 part: per se known catalyst) in place of the octabutyl-tetraacetoxy-stannoxane and mixture of the aforementioned products containing no catalysts are used. These materials are then subjected to a similar treatment to that outlined above to cure the polyester polyol. The results are as follows:

TABLE 1

| Catalyst | Heating at 120°C for 20 minutes | |
|---|---|---|
| No catalyst | Non-cured | cured by heating at 200°C for 20 min. |
| N-methyl morpholine | Non-cured | cured by heating at 170°C for 20 min. |
| octabutyl-tetraacetoxy-ystannoxane | Cured completely | |

EXAMPLE 2.

A blocked polyisocyanate (50 parts) which is obtained by the addition reaction of phenol (3 mols) with the reaction product of TDI (3 mols) and trimethylol propane (1 mol) is dissolved in ethyl acetate (100 parts).

This solution (300 parts) is mixed with octapropyl-dichloro-dihydroxy-stannoxane (in variable amounts; see Table 2), and then the mixture is further mixed with the same polyester-polyol (100 parts) as in Example 1, dissolved in toluene (200 parts).

The thus-obtained mixture is applied to a metal plate and heated in an electric furnace to cure the polyester polyol with NCO groups regenerated by heating.

The results are as follows:

TABLE 2

| Amount of stannoxane used (in parts by weight of the mixture) | Heating condition | | |
|---|---|---|---|
| | 80°C 20 min. | 100°C 20 min. | 110°C 20 min. |
| 0.05 | non-cured | non-cured | cured |
| 0.25 | non-cured | cured | cured completely |
| 0.50 | non-cured | cured | cured completely |
| 0 | non-cured | non-cured | non-cured by heating at 180°C for 20 min. |

EXAMPLE 3.

Polyether triol (60.4 parts) having a hydroxyl number of 160 obtained by the addition polymerization of propylene oxide and glycerol as an initiator, trimethylol propane (16 parts) and TDI (38 parts) are allowed to react with each other at 60° C to give a prepolymer whose NCO content is 4.8 percent The prepolymer (880 parts) is allowed to react with m-cresol (108 parts) at 140° C for 2 hours to give a blocked isocyanate compound.

The blocked isocyanate compound (50 parts) is dissolved in 100 parts of ethyl acetate.

The solution (100 parts) is mixed with 0.5 part of octabutyl-tetraacetoxy-stannoxane, followed by emulsifying the mixture into an aqueous solution (67 parts) containing dialkylsulfosuccinate (3 parts) as the emulsifier.

The thus-obtained emulsion is applied to a glass plate and heated in an electric furnace.

With the reaction of regenerated NCO groups and mixture in the air, the curing is completed by heating at 90° C within 20 minutes.

But without the octabutyl-tetraacetoxy-stannoxane, curing does not occur by heating at 180° C for 20 minutes or longer.

Example 4.

TDI (520 parts) is allowed to react the castor oil (1,000 parts) at 60° C to produce a prepolymer, which is then allowed to react with phenol (324 parts) at 140° C to produce a blocked isocyanate compound.

The blocked isocyanate compound (50 parts) is dissolved in ethylacetate (100 parts).

To the solution (100 parts) is added octabutyl-tetraacetoxy-stannoxane (0.2 part), and then the mixture is further mixed with 4,4′-methylene-bis-(2-chloraniline) (15 parts) followed by pouring the mixture into an aqueous solution (67 parts) containing sodium alkyl naphthalene sulfonate (2 parts) and the copolymer (3 parts) of ethylene oxide and propylene oxide to give an emulsion.

The thus-obtained emulsion is applied to a glass plate and heated at 120° C in an electric furnace to produce, within 20 minutes, a cured rigid film having a hardness of 57 (Sward rocker value).

EXAMPLE 5.

The same blocked isocyanate compound (65 parts) as in Example 3 is dissolved in ethyl acetate (100 parts). To the solution is added octamethyl-tetraacetoxy-stannoxane (0.4 part) and then the mixture is further mixed with a polyester polyol (80 parts) obtained by the condensation of ethylene glycol (71 parts) and adipic acid (146 parts), followed by pouring the mixture into aqueous solution (67 parts) containing sodium alkylbenzene sulfonate (2 parts) and polyethylene oxide dodecyl ether (3 parts) to produce an emulsion.

The thus-obtained emulsion is applied to a glass plate and heated at 120° C in an electric furnace to produce, within 20 minutes, a tough and elastic film.

EXAMPLE 6.

TDI (522 parts) is allowed to react with trimethylol propane (134 parts) at 80° C for 2 hours to give to give prepolymer having an isocyanate content of 21.8 percent.

The prepolymer (656 parts) is allowed to react with m-cresol (324 parts) at about 130° C to about 150° C for one hour to produce a yellowish blocked isocyanate compound.

The blocked isocyanate compound (20 parts) is dissolved in a solution containing a polyester polyol (14 parts) having a hydroxyl number 253 which is obtained by the condensation of adipic acid (438 parts), 1,4-butylene glycol (180 parts) and hexane triol (268 parts), ethyl acetate (22 parts), toluene (22 parts) and "Cellosolve" acetate (22 parts).

To the thus-obtained solution (100 parts) is added octapropyl-dichloro-dihydroxy-stannoxane (0.1 part).

The mixture is sprayed on a metal plate and heated in an electric furnace in order to form a cured film.

As controls, mixture products consisting of the same ingredients as above, except the catalyst N-methylmorpholine (0.1 part) is used in place of said stannoxane, or a mixture wherein no catalyst is used, are employed and are subjected to a procedure essentially the same as above to effect the desired curing.

The results are as follows:

TABLE 3

| Catalyst | heating at 120°C for 20 minutes | |
|---|---|---|
| No catalyst | non-cured | cured by heating at 200°C for 20 min. |
| Octapropyl-dichloro-dihydroxy-stannoxane | cured completely | |
| N-methyl-morpholine | non-cured | cured by heating at 170°C for 20 min. |

EXAMPLE 7.

The same solution (100 parts) containing a blocked isocyanate compound dissolved in a mixture of a polyester polyol, ethylacetate, toluene and "Cellosolve" acetate as that obtained in Example 6 is mixed with octabutyl-tetraacetoxy-stannoxane (variable amounts; see Table 4).

The thus-obtained mixture is sprayed on an iron plate and heated in an electric furnace to form a cured film.

By dipping the iron plate coated with the cured film formed into butyl acetate and observing the thus-treated film after certain stated periods, the resistance to chemicals of the film is measured.

The results are as follows:

TABLE 4

| Amount of catalyst used (parts) | Properties of cured film | 160°C 30 min. | 120°C 30 min. | Heating Conditions 110°C 30 min. | 100°C 30 min. | 80°C 30 min. |
|---|---|---|---|---|---|---|
| 0 | hardness | 63 | 12 | — | — | — |
|  | resistance to chemicals | B-C in.cd. | C n.cd. | C n.cd. | C n.cd. | C n.cd. |
| 0.02 | hardness | 62 | 58 | 24 | 6 | — |
|  | Resistance to chemicals | A co.cd | A co.cd. | B cd. | C n.cd. | C n.cd. |
| 0.1 | hardness | 64 | 63 | 55 | 15 | 8 |
|  | resistance to chemicals | A co.cd. | A co.cd | A co.cd. | B-C in.cd. | C n.cd. |
| 0.5 | hardness | 64 | 65 | 63 | 35 | 6 |
|  | resistance to chemicals | A co.cd. | A co.cd. | A co.cd. | A-B cd. | C n.cd. |

N.B.

| | |
|---|---|
| Hardness | : Measured as Sward rocker value. |
| Resistance to chemicals | : A, no change appreciable after 24 hours; B, change appreciable within 24 hours; C, change appreciable within one hour. |
| cd. | : Cured |
| n.cd. | : Non-cured |
| co.cd. | : Completely cured |
| in.cd. | : Incompletely cured |

EXAMPLE 8.

The same solution (100 parts) containing a blocked isocyanate compound dissolved in a mixture of a polyester polyol, ethyl acetate, toluene and "Cellosolve" acetate as that obtained in Example 6 is mixed with 0.1 part of various stannoxanes.

With the use of thus-obtained mixtures, a similar procedure as in Example 7 is performed.

The results are as follows:

TABLE 5

| Stannoxane used $R_1, R_2$ $R_3, R_4 X_1, X_2$ | Properties of cured film | 100°C 30 min. | Heating Conditions 110°C 30 min. | 120°C 30 min. | 130°C 30 min. |
|---|---|---|---|---|---|
| Pr. Cl, OH | resistance to chemicals | C n.cd. | A-B cd. | A co.cd. | A co.cd. |
| Bu. $CH_3COO$ ($X_1^3$  $X_2$) | resistance to chemicals | B-C in.cd. | A co.cd. | A co.cd. | A co.cd. |
| Bu. HCOO ($X_1$  $X_2$) | resistance to chemicals | B-C in.cd. | A co.cd. | A co.cd. | A co.cd. |
| Bu. NCS ($X_1$  $X_2$) | resistance to chemicals | B-C in.cd. | A cd. | A co.cd. | A co.cd. |
| Bu. $CH_2$CHCOO ($X_1$  $X_2$) | resistance to chemicals | B-C in.cd. | A-B cd. | A co.cd. | A co.cd. |
| Bu. $CNCH_2COO$ ($X_1$  $X_2$) | resistance to chemicals | C n.cd. | A-B in.cd. | A cd. | A co.cd. |
| Bu. NCO ($X_1$  $X_2$) | resistance to chemicals | B-C in.cd. | A cd. | A co.cd. | A co.cd. |
| Bu.PhCH CHCOO ($X_1$  $X_2$) | resistance to chemicals | C n.cd. | B in.cd. | A cd. | A co.cd. |
| Bu. $PhCH_2COO$ ($X_1$  $X_2$) | resistance to chemicals | C n.cd. | B in.cd. | A cd. | A co.cd. |
| Bu. $C_{17}H_{33}COO$ ($X_1$  $X_2$) | resistance to chemicals | C n.cd. | B n.cd. | A-B cd. | A co.cd. |
| Bu. $CH_3O$ ($X_1$  $X_2$) | resistance to chemicals | B-C in.cd. | B cd. | A co.cd. | A co.cd. |

N.B.

| | |
|---|---|
| A, B, C | : The same meaning as in Example 7. |
| Pr., Bu., Ph. | : Meaning respectively propyl, butyl and phenyl. |
| cd., n.cd., co.cd., in.cd. | : Have the same meaning as in Example 8 and Example 9. |

EXAMPLE 9.

The same solution (100 parts) containing a blocked isocyanate compound dissolved in a mixture of polyester polyol, ethyl acetate, toluene and "Cellosolve" acetate as that obtained in Example 6 is mixed with 0.1 part of octabutyl-tetraacetoxy-stannoxane. The thus-obtained mixture is sprayed on an iron plate and heated at 120°C for 30 minutes to form a cured film and the properties of the cured film formed on the surface of an iron plate are examined.

The results are as follows:

TABLE 6

| | |
|---|---|
| Hardness (Sward rocker value) | 63 |
| Impact test (DuPont's method) | 1 kilogram 50 centimeters pass |
| Scratch test | 20/20 (rest/total) |
| Erichsen test | 8 millimeters pass |
| Bending test | 2 millimeters 180° pass |
| Resistance to chemicals butyl acetate ) methyl isobutyl ketone ) benzene ) | No change appreciable after 200 hours |
| ethanol (50 percent) ) 5% sulfuric acid ) 5% sodium hydroxide ) | |

EXAMPLE 10.

The same prepolymer (880 parts) whose NCO content is 4.8 percent as in Example 3 is mixed with phenol (94 parts), xylene (47 parts) and "Cellosolve" acetate (47 parts). The mixture is heated at 140°C for 2 hours to produce a blocked isocyanate compound.

The blocked isocyanate is mixed with octabutyl-tetraformyloxy-stannoxane (0.5 part), followed by pouring the thus-obtained mixture into an aqueous solution (67 parts) containing dialkyl sulfosuccinate (3 parts) and a polyoxy ethylene alkyl ether (2 parts) to form an emulsion.

A vulcanized natural rubber sheet is dipped into the emulsion obtained above and dried at 40°C for 5 minutes, followed by heating the thus-treated rubber sheet at 100°C for 20 minutes to form a cured film on the surface of the rubber sheet by the reaction of regenerated NCO groups with moisture in the air.

Without a stannoxane, however, a film is not formed, even by heating at 170°C for 20 minutes or longer.

The properties of thus-formed film are as follows:

TABLE 7

| | |
|---|---|
| 200 percent elongation | Pass |
| Bending test (180°) | Pass |
| Gloss | Good |
| Resistance to chemicals | |
| Benzene | No change appreciable after 20 hours |
| Butyl acetate | No change appreciable after 20 hours |

EXAMPLE 11.

The emulsion (50 parts) obtained in Example 10 is mixed with a polyester polyol (1.7 parts) having a hydroxyl number of 460 which is obtained by the addition polymerization of propylene oxide and glycerol as an initiator.

A vulcanized natural rubber sheet is dipped into the mixture obtained above and dried at 40° C for 5 minutes, followed by heating the thus-treated rubber sheet at 100° C for 20 minutes to form a cured film on the surface of the rubber sheet.

Without the stannoxane, however, the cured film is not formed.

The properties of the thus-formed film are as follows:

TABLE 8

| | |
|---|---|
| 200 percent elongation | Pass |
| Bending test (180°) | Pass |
| Gloss | Good |
| Resistance to chemicals | |
| Benzene | No change appreciable after 20 hours |
| Butyl acetate | No change appreciable after 20 hours |

EXAMPLE 12.

Caster oil (27.6 parts) and 1,2,6-hexane triol are dissolved in a solvent consisting of xylene (20 parts) and "Cellosolve" acetate (20 parts), followed by allowing this mixture to react with tolylene diisocyanate (27.6 parts) at 60° C for 3 hours to produce a prepolymer containing 5.4 percent of isocyanate.

The prepolymer (780 parts) is allowed to react with m-cresol (108 parts) by heating at 140° C for 2 hours in the presence of a solvent consisting of xylene (36 parts) and "Cellosolve" acetate (36 parts) to produce a yellowish blocked isocyanate compound.

The prepolymer (100 parts) is mixed with octabutyl-tetraacetoxy-stannoxane (0.2 parts) and 4,4'-methylene-bis-(2-chloraniline) (15 parts), followed by pouring the mixture into an aqueous solution (135 parts) containing sodium alkyl naphthalene sulfonate (2 parts) and a block copolymer (2 parts) of ethylene oxide and propylene oxide to give an emulsion.

According to a procedure essentially the same as in Example 9 with the use of the thus-obtained emulsion, a cured film is formed and its properties are examined. The results are as follows:

TABLE 9

| | |
|---|---|
| Hardness (Sward rocker value) | 48 |
| Impact test (DuPont's method) | 1 kilogram 50 centimeters pass |
| Scratch test | 20/20 |
| Erichsen test | 8 millimeters pass |
| Bending test | 2 millimeters 180° C pass |

EXAMPLE 13.

Polypropylene glycol (259 parts) having a molecular weight of 1,000 is allowed to react with 87 parts of TDI to form a viscous prepolymer with an NCO content of 5.8 percent.

The prepolymer (576 parts) is allowed to react with m-cresol (8.6 parts) at 70° C for 6 hours in the presence of octabutyl-tetraacetoxy-stannoxane (0.3 part) to produce a liquid composition consisting of a blocked isocyanate compound and said stannoxane.

The composition (662 parts) is mixed with 4,4'-methylene-bis-(2-chloraniline) (96.2 parts), followed by heating the thus-obtained mixture first at 105° C and then at 120° C for 2 hours to form a polyurethane elastomer.

EXAMPLE 14.

The same prepolymer (880 parts) as in Example 3 with an NCO content of 4.8 percent is allowed to react with phenol (98 parts) at 60° C for 2 hours to form a blocked isocyanate compound.

The blocked isocyanate compound (101 parts), octabutyl-tetraacyloxy-stannoxane (0.2 part), and polyether polyol (6 parts), having a molecular weight of 600 and a hydroxyl number of 460, which is obtained by the addition polymerization of propylene oxide and sorbitol and glycerol as initiators are poured into an aqueous solution (109 parts) containing a block copolymer (1.8 parts) of ethylene oxide with propylene oxide and a polyoxyethylene alkyl ether (1.2 parts) to produce an emulsion.

Non-woven fabrics are dipped into the emulsion obtained above, and after the excess emulsion is squeezed out from thus treated non-woven fabrics, they are heated at 110° C for 30 minutes to obtain non-woven fabrics of improved properties, e.g., of good flexibility and superior strength.

The tensile strength of the thus-obtained non-woven fabrics is 3.2 kilograms per square millimeter.

Treating the thus-obtained fabrics with trichlor-ethylene, 4 parts of the total resin is released therefrom.

EXAMPLE 15.

Hexamethylene diisocyanate (168 parts) dissolved in butyl acetate (441 parts) is allowed to react with lauryl alcohol (186 parts) at 80° C for half an hour and the reaction product is then allowed to react with methyl ethyl ketone oxime (87 parts) at 80° C for 2 hours.

The thus-obtained reaction product is mixed with octabutyl-tetraacetoxy-stannoxane (1.7 parts), followed by pouring the mixture into an aqueous solution (1,324 parts) containing a block copolymer (14 parts) of ethylene oxide with propylene oxide and a polyoxyethylene alkyl ether (8 parts) to form an emulsion.

Cotton cloth is dipped into the emulsion obtained above, and the excess emulsion is emulsion obtained above, and the excess emulsion is squeezed out from the cloth. On heating the cloth treated as above at 130° C for half an hour, porous and water-proof cotton cloth is produced as the result of the reaction of the hydroxyl groups in the cloth with regenerated NCO groups.

The water-proof property in the thus-produced cotton cloth is not lost even by washing.

EXAMPLE 16.

$\omega,\omega'$-diisocyanate-1,3-dimethylbenzene (188 parts) is allowed to react with w-hydroperfluoroalcohol(($CH_3$—C $F_2$—$CF_2)_2$—$CH_2OH$) (292 parts) to produce a waxy blocked isocyanate compound.

The blocked isocyanate compound (48 parts) and a polyester polyol of a hydroxyl number 253 which is obtained by the condensation of adipic acid (438 parts) and 1,4-butylene glycol (180 parts) are dissolved in "Cellosolve" acetate (140 parts) and mixed with octabutyl-tetraacetoxy-stannoxane (0.3 part).

An iron plate has the thus-obtained mixture applied thereto and is then heated at 120° C for 30 minutes to produce a cured film having excellent resistance to chemicals on the surface of the iron plate.

EXAMPLE 17.

A blocked isocyanate compound (100 parts) (variable; see Table 10) are mixed with magnesium sulfate ($MgSO_4$—$7H_2O$) and 1 part of octabutyl-tetraacetoxy-stannoxane.

On heating the mixture, the NCO groups react with the crystal water in the $MgSO_4$—$7H_2O$ to evolve carbon dioxide gas.

The mixture is heated stepwise in a stream of nitrogen gas, the gas evolved on heating is continuously introduced into barium hydroxide solution, and the temperature at which the barium hydroxide solution turns to white is recorded as the regenerating temperature of the blocked isocyanate group.

With the mixture containing no stannoxane, similar procedures are performed.

The results are as follows:

TABLE 10

| Isocyanate Blocking Agent | | Regenerating Temperature °C | |
|---|---|---|---|
| | | with stannoxane | no stannoxane |
| TDI | methanol | 150–155 | 180–185 |
| | ethanol | 120–125 | 150–155 |
| | n-pentanol | 115–170 | 205–210 |
| | n-propanol | 125–130 | 180–185 |
| | n-butanol | 120–125 | 195–200 |
| | ethylene chlorhydrine | 110–115 | 155–160 |
| | ω-hydroperfluoro alcohol* (n=2) | 105–110 | 190–195 |
| | ω-hydroperfluoro alcohol** (n=2) | 105–110 | 205–210 |
| | isopropyl alcohol | 135–140 | 170–175 |
| | 1,3-dichlor-2-propanol | 125–120 | 165–170 |
| | phenol | 105–110 | 140–145 |
| | p-nitro phenol | 85–90 | 120–125 |
| | m-cresol | 100–105 | 135–140 |
| MDI | phenol | 130–135 | 175–180 |
| | m-cresol | 120–125 | 165–170 |
| MXDI | phenol | 130–135 | 180 |
| | m-cresol | 120–125 | 170 |
| EDI | phenol | 115–120 | 155–160 |
| | m-cresol | 110–115 | 140–155 |

*$CH_3$-$CF_2$-$CF_2$-$CH_2OH$
**$CH_3$-$(CF_2$-$CF_2)_2$-$CH_2OH$

What is claimed is:

1. A low temperature-curable polyurethane forming composition comprising, as two essential ingredients, (a) a blocked organic polyisocyanate compound, and (b) a stannoxane of the formula

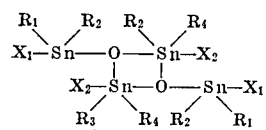

wherein $X_1$ is a member selected from the group consisting of halogen, -OH, lower alkoxy, carboxylic acid acyloxy, -NCO and -NCS; $X_2$ is a member selected from the group consisting of -OH, lower alkoxy, carboxylic acid acyloxy, -NCO and -NCS; and each of $R_1$, $R_2$, $R_3$ and $R_4$ is lower alkyl.

2. A low temperature-curable polyurethane forming composition comprising, as three essential ingredients, (a) a blocked organic polyisocyanate, (b) a stannoxane of the formula

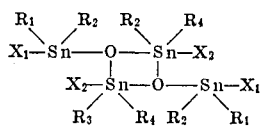

wherein $X_1$ is a member selected from the group consisting of halogen, OH, lower alkoxy, carboxylic acid acyloxy, -NCO and -NCS; $X_2$ is a member selected from the group consisting of -OH, lower alkoxy, carboxylic acid acyloxy, -NCO and -NCS; and each of $R_1$, $R_2$, $R_3$ and $R_4$ is lower alkyl; and (c) an additional compound containing active hydrogen atoms; the blocked polyisocyanate compound having no free isocyanate groups.

3. A composition as claimed in claim 1, wherein each of $X_1$ and $X_2$ is NCO.

4. A composition as claimed in claim 1, wherein each of $X_1$ and $X_2$ is NCS.

5. A composition as claimed in claim 1, wherein the stannoxane is octapropyl-dichloro-dihydroxy-stannoxane.

6. A composition as claimed in claim 1, wherein the stannoxane is octabutyl-tetraformyloxy-stannoxane.

7. A composition as claimed in claim 1, wherein the stannoxane is octamethyl-tetraacetoxy-stannoxane.

8. A composition as claimed in claim 1, wherein the stannoxane is octabutyl-tetraisothiocyanato-stannoxane.

9. A composition as claimed in claim 1, wherein the stannoxane is octabutyl-tetraacetoxy-stannoxane.

10. A composition as claimed in claim 1 wherein the stannoxane is octabutyl-tetraacryloyloxy-stannoxane.

11. A composition as claimed in claim 1, wherein the stannoxane is octabutyl-tetracyanoacetoxy-stannoxane.

12. A composition as claimed in claim 1, wherein the stannoxane is octabutyl-tetrabenzyloyloxy-stannoxane.

13. A composition as claimed in claim 1 wherein the stannoxane is octabutyl-tetraoleoyloxy-stannoxane.

14. A composition as claimed in claim 1, wherein the stannoxane is octabutyl-tetramaleoyloxy-stannoxane.

15. A composition as claimed in claim 1, wherein the stannoxane is octabutyl-tetraisocyanato-stannoxane.

16. A composition as claimed in claim 1, wherein the stannoxane is octabutyl-tetramethoxy-stannoxane.

17. A composition as claimed in claim 1, wherein the blocked polyisocyanate compound is the reaction product of a blocking agent and an isocyanate terminated compound which is obtained by reacting an excess of a polyisocyanate with a polyol having a molecular weight of from about 300 about 3,000, the polyol being a member selected from the group consisting of polyester polyol and polyether polyol.

18. A composition as claimed in claim 2, wherein the blocked polyisocyanate compound is the reaction product of a blocking agent and an isocyanate terminated compound which is obtained by reacting an excess of a polyisocyanate with a polyol having a molecular weight of from about 300 to 3,000, and the additional compound containing active hydrogen atoms is a polyol having a molecular weight of from about 300 to about 3,000, each polyol being selected from the group consisting of polyester polyol and polyether polyol.

19. A composition as claimed in claim 1, wherein said polyisocyanate is aromatic.

20. A composition as claimed in claim 2, wherein the blocked polyisocyanate compound is the reaction product of a blocking agent and an isocyanate terminated compound which is obtained by reacting an excess of a polyisocyanate with a polyol having a molecular weight of from about 300 to about 3,000, the polyol being a member selected from the group consisting of polyester polyol and polyether polyol, and the additional compound having active hydrogen atoms is a low molecular weight member selected from the group consisting of polyols, aminoalcohols, aromatic primary diamines and aliphatic primary diamines.

21. A composition as claimed in claim 2, wherein the blocked polyisocyanate compound is the reaction product of (I) a blocking agent with (II) a member selected from the group consisting of (A) a polyisocyanate, and (B) an addition product of (1) a polyisocyanate (2) (2) a low molecular compound having active hydrogen atoms and selected from the group consisting of (a) polyols, (b) aminoalcohols, (c) aromatic primary diamines and (d) aliphatic primary diamines, and the additional compound containing active hydrogen atoms is a polyol having a molecular weight of from about 300 to about 3,000 and selected from the group consisting of a polyester polyol and a polyether polyol.

22. A composition as claimed in claim 20, wherein the additional low molecular compound containing active hydrogen atoms is an aromatic primary diamine.

23. A composition as claimed in claim 18, wherein the polyisocyanate is aromatic.

24. A composition as claimed in claim 20, wherein the polyisocyanate is aromatic.

25. A composition as claimed in claim 21, wherein the polyisocyanate is aromatic.

* * * * *